United States Patent [19]

Ueda

[11] Patent Number: 4,909,615
[45] Date of Patent: Mar. 20, 1990

[54] ZOOM LENS SYSTEM FOR USE IN AN IMAGE PROJECTING APPARATUS WITH KUM./O/ HLER ILLUMINATION

[75] Inventor: Toshihiko Ueda, Osaka, Japan

[73] Assignee: Minolta Camera Kabushiki Kaisha, Osaka, Japan

[21] Appl. No.: 198,078

[22] Filed: May 24, 1988

[30] Foreign Application Priority Data

May 29, 1987 [JP]  Japan .................................. 62-131279
Jul. 22, 1987 [JP]  Japan .................................. 62-184376

[51] Int. Cl.⁴ ...................... G02B 15/16; G02B 15/177
[52] U.S. Cl. ..................................... 350/427; 350/426
[58] Field of Search ......................... 350/423, 427, 426

[56] References Cited

U.S. PATENT DOCUMENTS 4,113,344  9/1978  Shoemaker ...................... 350/423 X
4,278,334  7/1981  Maeda .................................... 353/85
4,433,906  2/1984  Nakatami et al. ...................... 355/55

FOREIGN PATENT DOCUMENTS 57-73715  5/1982  Japan .

Primary Examiner—Scott J. Sugarman
Attorney, Agent, or Firm—Price, Gess & Ubell

[57] ABSTRACT

A zoom lens system for use in an image projecting apparatus with Köhler illumination in which an image on an object plane is enlargingly projected by the zoom lens system to an image plane apart from the object plane at a definite distance. The zoom lens system comprises a first lens group and a second lens group being disposed in this order from the image plane and both being movable along the optical axis for zooming and an aperture stop being disposed between the first and second lens groups. The aperture stop is independently moved along the optical axis so as to make the pupil position at the reduction side substantially invariable in an operation of zooming, with the result that the condition of Köhler illumination system is satisfied without changing the position of a condensing lens system.

17 Claims, 7 Drawing Sheets

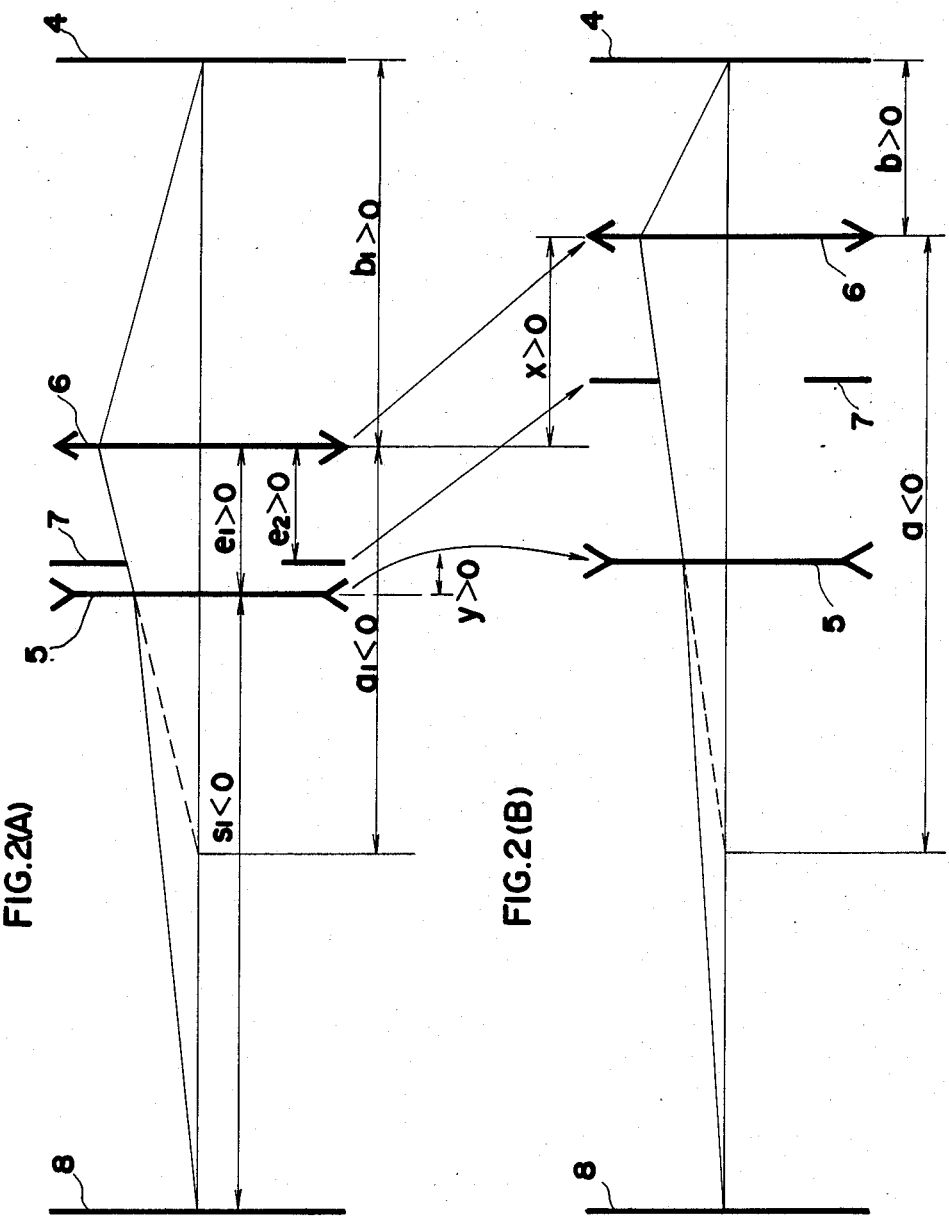

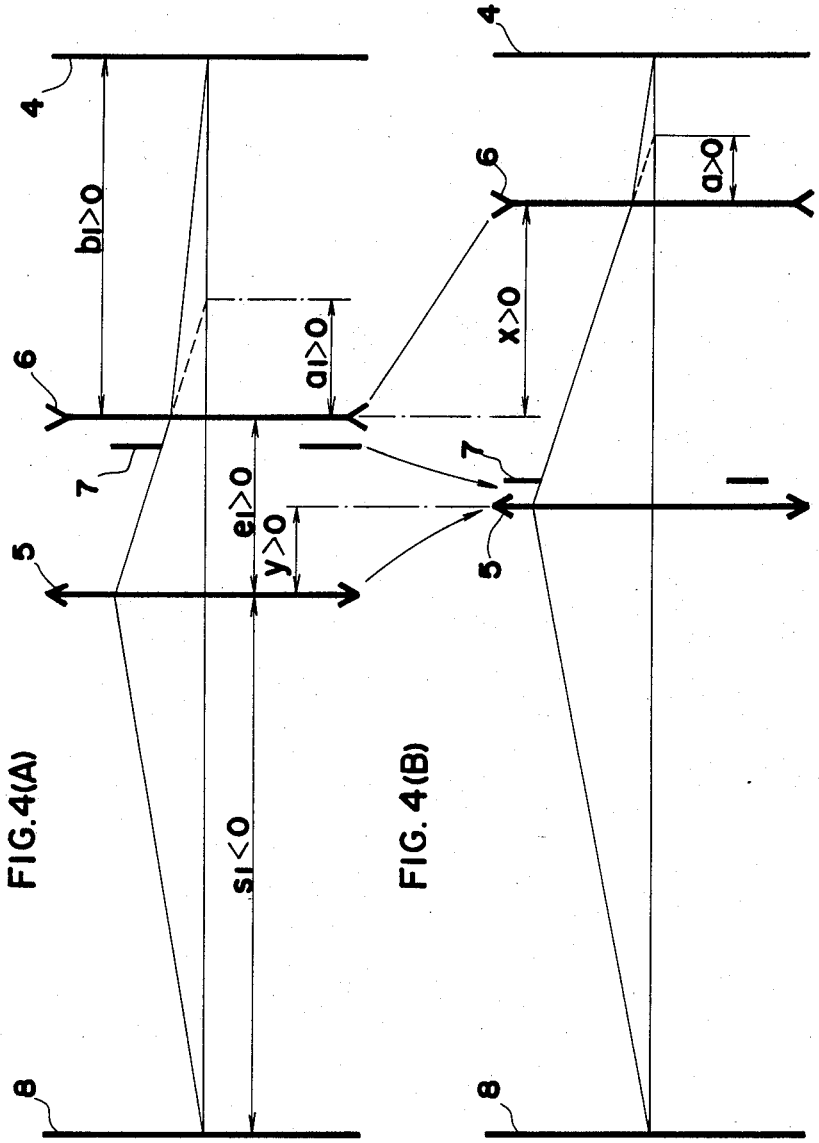

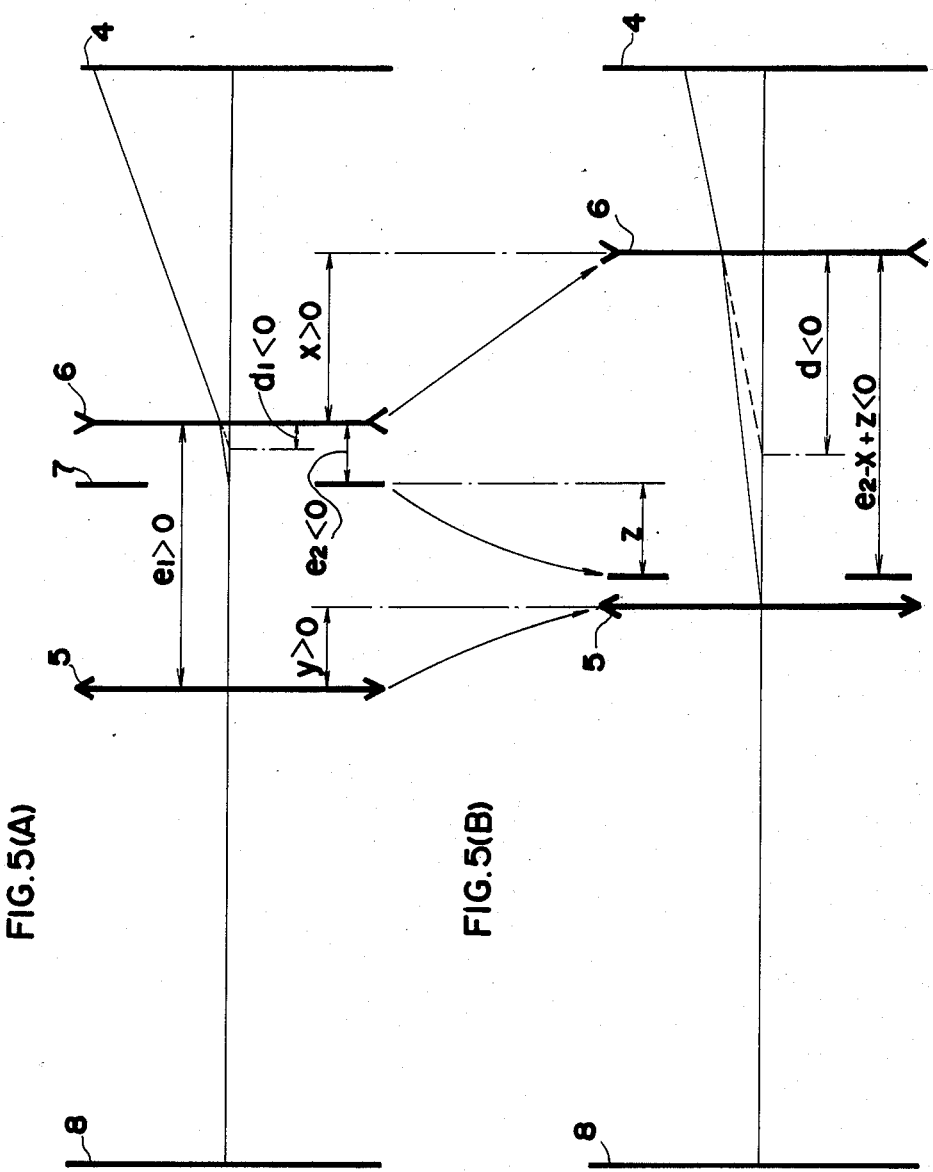

ABSTRACT# ZOOM LENS SYSTEM FOR USE IN AN IMAGE PROJECTING APPARATUS WITH KUM./O/ HLER ILLUMINATION

BACKGROUND OF THE INVENTION

1. Field of the Invention.

The present invention relates to a zoom lens system for use in an image projecting apparatus with Köhler illumination, and more particularly to a zoom lens system wherein a pupil position at the reduction side is made substantially invariable in an operation of zooming so as to satisfy the conditions of Köhler illumination without changing the position of a condensing lens system in Köhler illumination.

2. Description of the Prior Art.

Köhler illumination has frequently been used in a projecting optical system since it has conventionally given a high illumination efficiency. One example of such projecting optical system employing Köhler illumination is a system for projecting images of microfilms.

A microfilm image projecting optical system employing conventional Köhler illumination will be explained hereinbelow with reference to FIG. 1. Specifically, the projecting optical system has a zoom lens system comprising, from the enlargement side, a first lens group 5 of a negative refractive power, an aperture stop 7 and a second lens group 6 of a positive refractive power. This zoom lens system projects an image on a film 4 onto a screen 8 with the magnification varied. In order to illuminate the film 4, luminous flux from a light source 1 is callinated by a first condensing lens unit 2. Then, the image of the light source 1 is formed at the position of the aperture stop 7 by a second condensing lens unit 3. In this way, the filament image of the light source 1 is formed at the pupil position of the zoom lens system, with the result that the conditions of Köhler illumination is satisfied as well as that the image having a effective illumination density is projected on the screen 8.

However, the position of the aperture stop 7 is altered in an operation of zooming from the longest focal length side shown in FIG. 1A to the shortest focal length side shown in FIG. 1B. Accordingly, in this projecting optical system, it is necessary that either the first or second condensing lens group 2 or 3, or alternatively the whole condensing lens group is moved to fulfill the conditions of Köhler illumination.

Namely, in order to maintain the conditions of Köhler illumination in the operation of zooming, the condensing lens system has to be manually adjusted by users or to be moved in a mechanically interlocking relationship with the zoom lens system, causing trouble in operating the machine or entailing an increased cost to the machine.

SUMMARY OF THE INVENTION

The main object of the present invention is to provide a zoom lens system for use in an image projecting apparatus with Köhler illumination which always fulfills the conditions of Köhler illumination without changing the arrangement of a condensing lens system.

Another object of the present invention is to provide a zoom lens system for use in an image projecting apparatus with Köhler illumination wherein an aperture stop is independently moved to make the pupil position substantially invariable in an operation of zooming.

These and other objects of the present invention can be accomplished by providing a zoom lens system for use in an image projecting apparatus with Köhler illumination in which an image on an object plane is enlargingly projected by the zoom lens system to an image plane apart from the object plane at a definite distance, the zoom lens system comprising a first lens group and a second lens group being disposed in this order from the image plane and both being movable along the optical axis for zooming and an aperture stop disposed between the first and second lens groups, the aperture stop being independently movable along the optical axis so as to make the pupil position at the reduction side substantially invariable in an operation of zooming.

These and other objects, advantages and features of the invention will become apparent from the following description thereof taken in conjunction with the accompanying drawings which illustrate specific embodiments of the invention. cl BRIEF DESCRIPTION OF THE DRAWINGS In the following description, like parts are designated by like reference numbers throughout the several drawings.

FIGS. 1A and 1B are diagrams showing a conventional projecting optical system at the longest focal length side and the shortest focal length side respectively;

FIGS. 2(2A, 2B) and 3(3A and 3B) are diagrams showing paraxial refractive power arrangements in a zoom lens system according to a first model of the present invention; FIGS. 2A and 3A show the arrangements at the longest focal length side, while FIGS. 2B and 3B show them at the shortest focal length side;

FIGS. 4(4A, 4B) and 5(5A and 5B) are diagrams showing paraxial refractive power arrangements in a zoom lens system according to a second model of the present invention; FIGS. 4A and 5A show the arrangements at the longest focal length side, while FIGS. 4B and 5B show them at the shortest focal length side;

FIG. 6 is a diagram in a sectional view showing a lens system applying the first model; and FIG. 7(7A, 7B) is a diagram in a sectional view showing a lens system applying the second model; FIGS. 7A shows the lens system at the longest focal length side, while FIGS. 7B shows it at the shortest focal length side.

DETAILED DESCRIPTION OF THE PREFERRED EMBODIMENTS

Figures 1A, 1B:
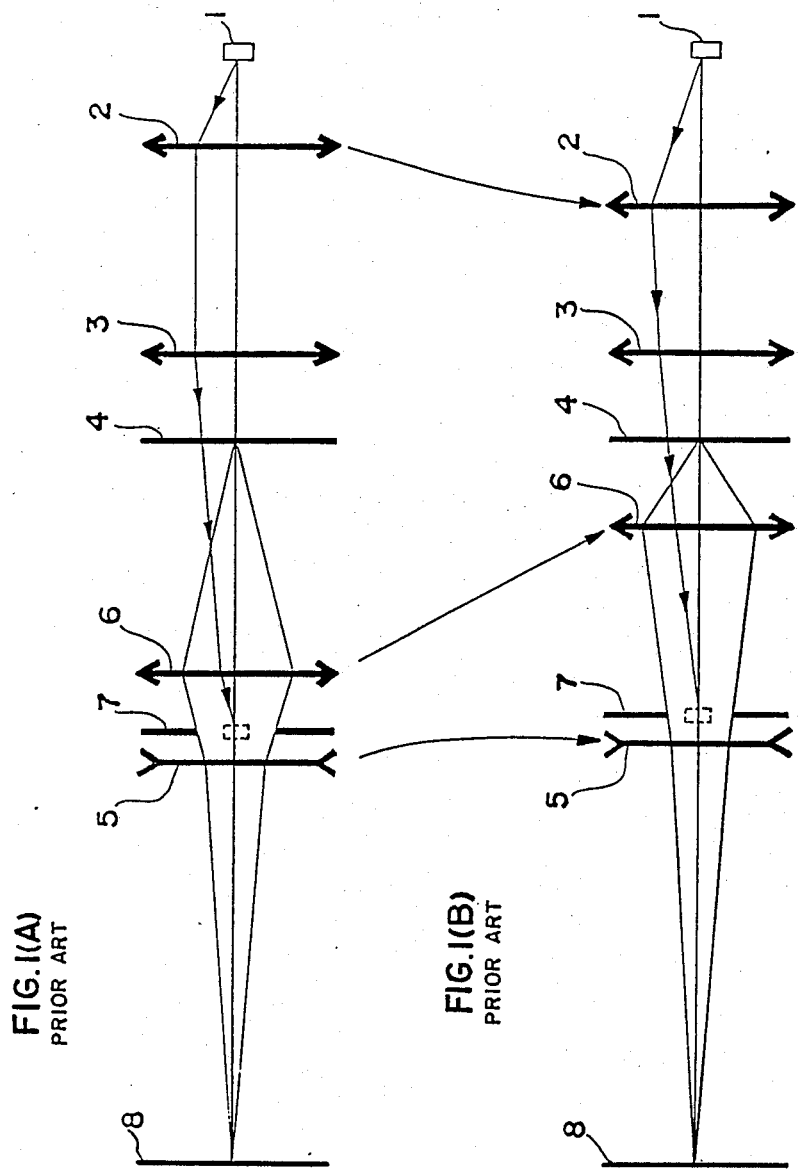

A first model system of the present invention will be explained hereinbelow with reference to FIGS. 2A, 2B, 3A and 3B.

FIG. 2 shows a two-component zoom lens system comprising, from the enlargement side, i.e., an image plane (screen 8) side, a first lens group 5 of a negative refractive power, an aperture stop 7 and a second lens group 6 of a positive refractive power. FIG. 2A illustrates a condition in the longest focal length side, and FIG. 2B in the shortest focal length side.

Zooming operation from the longest focal length side to the shortest focal length side is carried out in this zoom lens system by moving both the first lens group 5 of a negative refractive power and the second lens group 6 of a positive refractive power to an object plane (film 4) side so as to increase a distance between both lens groups. The film 4 is illuminated by an illumination system (not shown).

Next, an example in the above-mentioned projecting lens system for fixing a pupil position at the reduction side will be explained with reference to a paraxial refractive power arrangement.

As shown in FIGS. 2A and 2B, the various factors of the lens system according to the first model are defined as follows:

$\psi_1$: a refractive power of the first lens group 5 of a negative refractive power (reciprocal number of a focal length) ($\psi_1 < 0$)

$\psi_2$: a refractive power of the second lens group 6 of a positive refractive power ($\psi_2 > 0$)

$e_1$: an optical distance from the first lens group 5 to the second lens group 6 in at the longest focal length side ($e_1 > 0$)

$S_1$: a distance from the first lens group 5 to the image plane 8 at the longest focal length side ($S_1 < 0$)

$a_1$: a distance from the second lens group 6 to the image point by the second lens group 6 relative to the object point on the object plane 4 at the longest focal length side ($a_1 < 0$)

$b_1$: a distance from the second lens group 6 to the object plane 4 at the longest focal length side ($b_1 > 0$)

x : a distance of movement of the second lens group 6 from the longest focal length side (x>0)

y : a distance of movement of the first lens group 5 from the longest focal length side (y>0)

a : a distance from the second lens group 6 to the image point by the second lens group 6 relative to the object point on the object plane 4 upon the movement of the second lens group 6 in an amount of x (a<0)

(I) Paraxial conditions at the longest focal length side
Concerning the second lens group 6, $$-\frac{1}{a_1} + \frac{1}{b_1} = \psi_2 \quad (1)$$

Concerning the first lens group 5, $$-\frac{1}{S_1} + \frac{1}{e_1 + a_1} = \psi_1 \quad (2)$$

(II) Paraxial conditions are represented when the second lens group 6 moves in an amount of x
Concerning the second lens group 6, $$-\frac{1}{a} + \frac{1}{b_1 - x} = \psi_2 \quad (3)$$

The lateral magnification is obtained from the following condition:

$$\beta_2 = \frac{b_1 - x}{a} \quad (4)$$

($\beta_2 < 0$)

Concerning the first lens group 5, $$-\frac{1}{S_1 - y} + \frac{1}{e_1 - y + x + a} = \psi_1 \quad (5)$$

The lateral magnification is obtained from the following condition:

$$\beta_1 = \frac{e_1 - y + x + a}{S_1 - y} \quad (6)$$

($\beta_1 > 0$)

From the condition (5), $$\psi_1 y^2 + Ay + B = 0 \quad (7)$$

wherein $$A = -\psi_1(x + a + S_1 e_1)$$

$$B = \psi_1 S_1(x + a + e_1) + x + a + e_1 - S_1 \quad (8)$$

From the above-mentioned condition (3), the variable a is represented as follows:

$$a = \frac{b_1 - x}{1 - \psi_2(b_1 - x)} \quad (9)$$

($a = a_1$ when $x = 0$)

Since $y > 0$, $$y(x) = \frac{-A - \sqrt{A^2 - 4\psi_1 B}}{2\psi_1}$$

Therefore, y can be written as a function of x.

Subsequently, explained hereinbelow are the conditions for moving the position of the aperture stop in order to fix the pupil position at the reduction side.

Figures 3A, 3B:
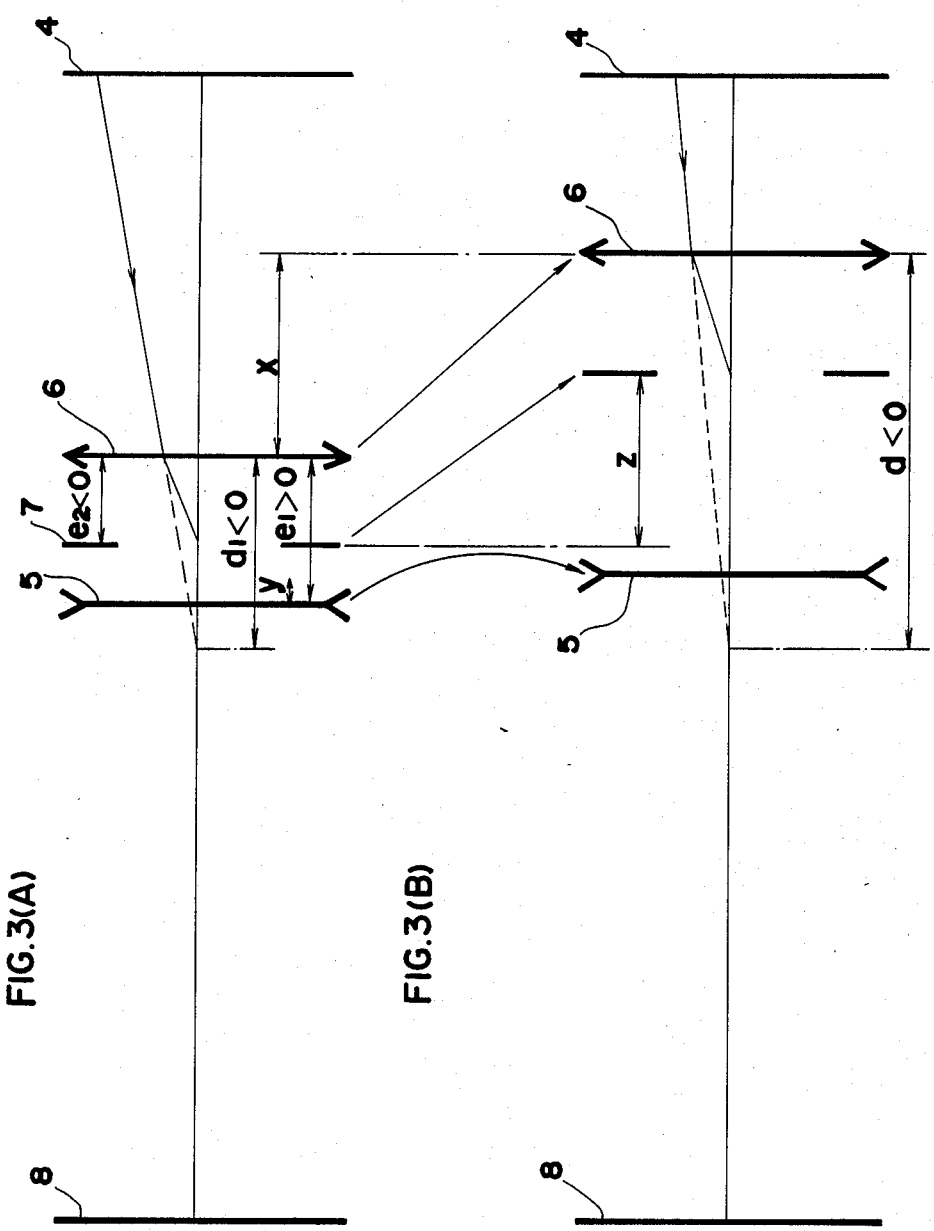

As shown in FIGS. 3A and 3B, the various factors are defined as follows:

$e_2$: an optical distance from the second lens group 6 to the position of the aperture stop 7 at the longest focal length side ($e_2 < 0$)

$d_1$: a distance from the second lens group 6 to the image point by the second lens group 6 in the case where the position of the aperture stop 7 is defined as an object point ($d_1 < 0$)

d: a value corresponding to the $d_1$ respectively in the case where the second lens group 6 moves in amount of x Z: an amount of movement of the aperture stop 7

(III) Pupil position at the longest focal length side
The image forming condition concerning the second lens group 6 is represented as follows:

$$-\frac{1}{e_2} + \frac{1}{d_1} = \psi_2 \quad (10)$$

The pupil position at the reduction side $P_I$ is represented as follows:

$$P_I = d_1 - b_1 \quad (11)$$

($p_I < 0$)

(IV) Pupil position upon the zooming movement of the second lens group 6 in an amount of x:
The image forming condition concerning the second lens group is represented as follows:

$$-\frac{1}{e_2 - x + Z} + \frac{1}{d} = \psi_2 \quad (12)$$

The pupil position at the reduction side $P_{II}$ is represented as follows:

$$P_{II} = d - b_1 + x \quad (13)$$

Since the condition for making the pupil position at the reduction side invariable is $P_I = P_{II}$, $$d = d_1 - x \quad (14)$$

From the condition (10), (12) and (14), $$Z = x - e_2 + \frac{1 - x(\psi_2 + 1/e_2)}{1/e_2 + \psi_2 \times (\psi_2 + 1/e_2)} \quad (15)$$

Therefore, the amount of movement Z of the aperture stop can be represented as a function x with the values $\psi_2$ and $e_2$ defined as an initial value.

Specifically, the pupil position at the reduction side can be maintained by affording the amount of movement obtained by the condition (15) to the aperture stop 7 in accordance with the movement of the second lens group.

Subsequently, a second model system of the present invention will be explained hereinbelow with reference to FIGS. 4A, 4B, 5A and 5B.

The structure is almost the same as that explained before except that the first lens group has a negative refractive power and the second lens group has a positive refractive power. Namely, as shown in FIG. 4, a zoom lens system of this model comprises, from the enlargement side, a first lens group 5a of a positive refractive power, an aperture stop 7, and second lens group 6a of a negative refractive power. Zooming operation from the longest focal length side to the shortest focal length side is carried out in the second model system by moving both the first lens group 5a of a positive refractive power and the second lens group 6 of a negative refractive power to an object plane side so as to increase a distance between both lens groups.

As for the paraxial conditions, the factors and conditions are defined by almost the same manner as those described before. However, with regard to the factors $\psi_1$, $\psi_2$, $a_1$, $a$ and the lateral magnifications $\beta_1$ and $\beta_2$, the marks of plus and minus are opposite to those of the above-mentioned model.

The paraxial conditions for the zoom lens system of the second model are represented by the same equations as those (1) to (15) described above except the equation (9).

The equation (9) becomes as follows since the marks of plus and minus are opposite to the factors as mentioned above:

$$y(x) = \frac{-A + \sqrt{A^2 - 4\psi_1 B}}{2\psi_1} \quad (9')$$

Namely, the pupil position at the reduction side can be maintained by affording the amount of movement Z defined by the equation (15) to the aperture stop 7.

The first and second embodiments of the projecting lens systems applying the former and latter model systems of the invention are shown in Tables 1 and 2, respectively. In these tables, r is the radius of curvature, d is the axial distance, N is the refractive index and $\nu$ is the Abbe number. Further, each projecting lens system is sectionally illustrated in FIGS. 6 and 7.

Figure 6:
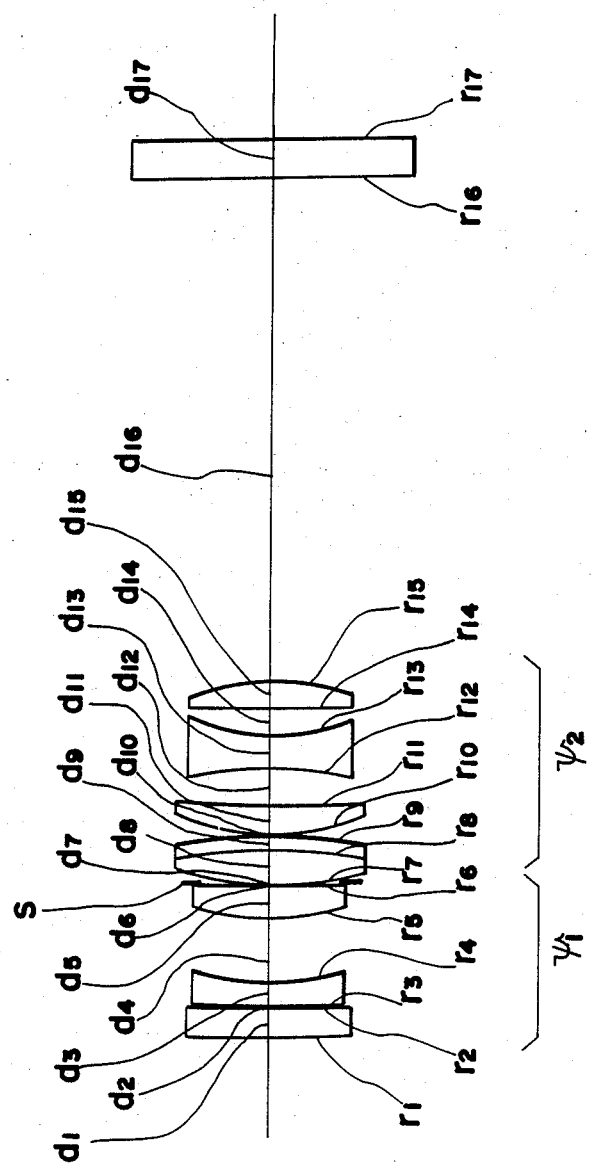

Referring to FIG. 6, a zoom lens system according to the first model of the present invention has from the enlargement side (left side of the drawing) a first lens group $\psi_1$ of a negative refractive power, an aperture stop S and a second lens group $\psi_2$ of a positive refractive power. A transparent glass plate ($r_{16}$, $r_{17}$) disposed at the right side of the lens system supports a microfilm (not shown) on the right side thereof. The first lens group $\psi_1$ consists of a bi-convex lens ($r_1$, $r_2$, a biconcave lens ($r_3$, $r_4$) and a meniscus lens ($r_5$, $r_6$). The second lens group $\psi_2$ consists of a compound lens consisting of a bi-convex lens ($r_7$, $r_8$) and a meniscus lens ($r_8$, $r_9$) which are cemented together, a meniscus lens ($r_{10}$, $r_{11}$), a bi-concave lens ($r_{12}$, $r_{13}$) and a bi-convex lens ($r_{14}$, $r_{15}$).

Figures 7A, 7B:
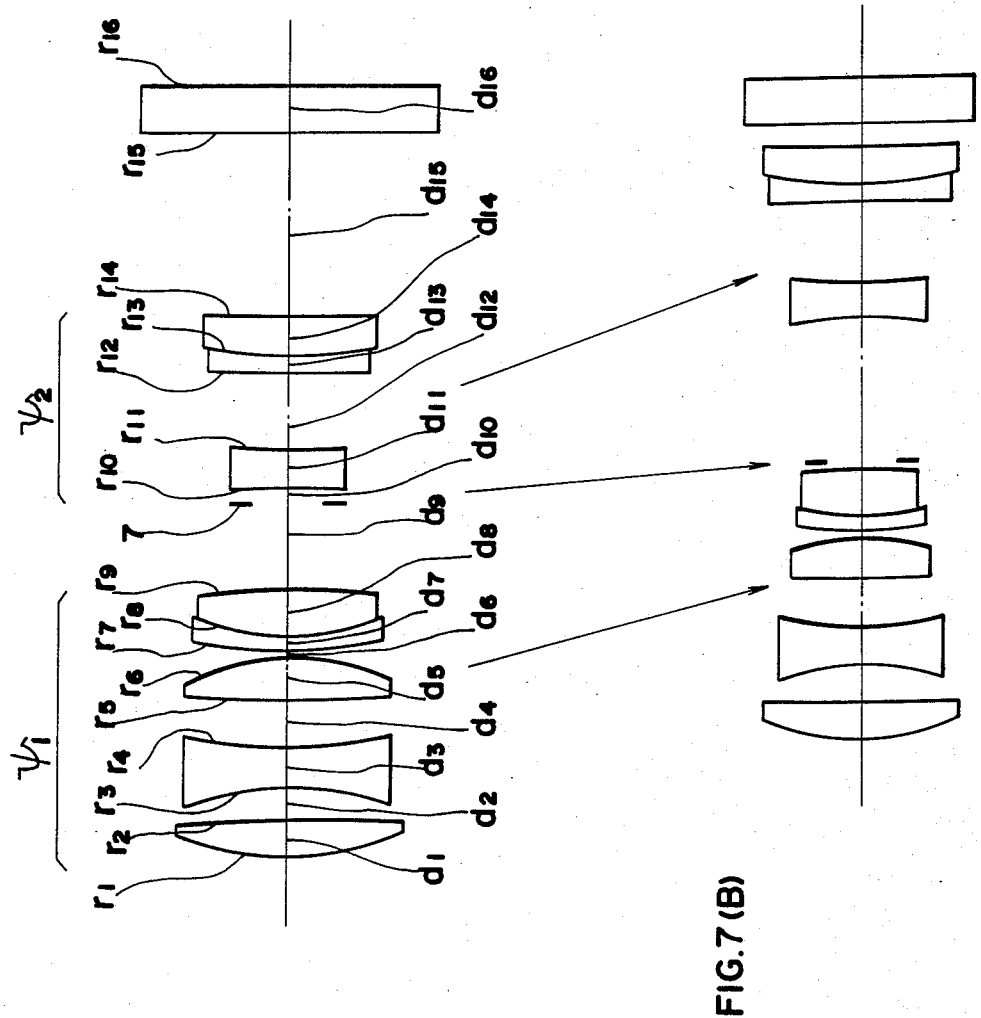

FIG. 7 shows a zoom lens system according to the second model of the present invention; FIGS. 7A shows the lens system at the longest focal length side, while FIGS. 7B shows it at the shortest focal length side. The zoom lens system according to the second model has a first lens group $\psi_1'$ of a positive refractive power, an aperture stop S and a second lens group $\psi_2'$ of a negative refractive power. The first lens group $\psi_1'$ consists of a meniscus lens ($r_1$, $r_2$), a bi-concave lens ($r_3$, $r_4$), a bi-convex lens ($r_5$, $r_6$) and a compound lens consisting of a meniscus lens ($r_7$, $r_8$) and a bi-convex lens ($r_8$, $r_9$) which are cemented together. The second lens group $\psi_2'$ consists of a bi-concave lens ($r_{10}$, $r_{11}$) and a compound lens consisting of a meniscus lens ($r_{12}$, $r_{13}$) and a meniscus lens ($r_{13}$, $r_{14}$) which are cemented together.

In both embodiments, an illumination system can use a conventional one such as shown in FIG. 1 in a form of fixed positions.

In the first embodiment, the aperture stop S is moved to the reduction side with the moving speed lower than that of the second lens group $\psi_2$ so as to increase a distance between the aperture stop S and the second lens group $\psi_2$ in the operation for zooming from the longest focal length side to the shortest focal length side. In the second embodiment, the aperture stop S is moved to the enlargement side with the moving speed lower than that of the second lens group $\psi_2$ so as to increase a distance between the aperture stop S and the second lens group $\psi_2$ in the operation for zooming from the longest focal length side to the shortest focal length side.

TABLE 1

[Embodiment 1]
$f = 46.0 - 36.5 - 26.2$  $F_{NO} = 5.4$

| Radius of curvature | Axial distance | Refractive index (Nd) | Abbe number ($\nu d$) |
|---|---|---|---|
| $r_1$ 745.1 | | | |
| | $d_1$ 2.8 | $N_1$ 1.6700 | $\nu_1$ 39.2 |
| $r_2$ −88.5 | | | |
| | $d_2$ 0.1 | | |
| $r_3$ −226.3 | | | |
| | $d_3$ 1.3 | $N_2$ 1.7440 | $\nu_2$ 44.9 |
| $r_4$ 17.7 | | | |
| | $d_4$ 6.1 | | |
| $r_5$ 21.9 | | | |
| | $d_5$ 2.2 | $N_3$ 1.8052 | $\nu_3$ 25.4 |
| $r_6$ 32.8 | | | |
| | $d_6$ 0.500−2.408−12.533 | | |
| S — | | | |
| | $d_7$ 0.018−5.579−9.514 | | |
| $r_7$ 27.2 | | | |
| | $d_8$ 3.1 | $N_4$ 1.5891 | $\nu_4$ 61.1 |
| $r_8$ −36.4 | | | |
| | $d_9$ 0.9 | $N_5$ 1.7006 | $\nu_5$ 30.1 |
| $r_9$ −85.9 | | | |
| | $d_{10}$ 0.07 | | |
| $r_{10}$ 18.3 | | | |
| | $d_{11}$ 2.2 | $N_6$ 1.7200 | $\nu_6$ 50.3 |
| $r_{11}$ 63.2 | | | |
| | $d_{12}$ 3.4 | | |
| $r_{12}$ −58.0 | | | |
| | $d_{13}$ 3.0 | $N_7$ 1.7006 | $\nu_7$ 30.1 |
| $r_{13}$ 14.6 | | | |

TABLE 1-continued

[Embodiment 1]
$f = 46.0 - 36.5 - 26.2 \ F_{NO} = 5.4$

| Radius of curvature | Axial distance | Refractive index (Nd) | Abbe number ($\nu d$) |
|---|---|---|---|
| | $d_{14}$ 2.4 | | |
| $r_{14}$ 171.8 | | | |
| | $d_{15}$ 2.0 | $N_8$ 1.7440 | $\nu_8$ 44.9 |
| $r_{15}$ −25.4 | | | |
| | $d_{16}$ 43.300−36.808−30.008 | | |
| $r_{16}$ ∞ | | | |
| | $d_{17}$ 3.000 | film holder | |
| $r_{17}$ ∞ | | | |
| | $\Sigma d = 76.422 - 77.399 - 84.659$ | | |

In the case where $\psi_1 = 0.02165$, $\psi_2 = -0.03514$, $e_1 = 10.84$, $e_2 = -0.81$, $S_1 = -1316.5$, $X_{max} = 13.290$, the equations of $y_{max} = 8.24$ and $Z = 3.80$ can be obtained. The pupil position is invariable in the zooming condition as shown by the equation of $P_I = P_{II} = -59.0$.

TABLE 2

[Embodiment 2]
$f = 45.0 - 38.5 - 32.4 \ F_{NO} = 5.0$

| Radius of curvature | Axial distance | Refractive index (Nd) | Abbe number ($\nu d$) |
|---|---|---|---|
| $r_1$ 19.127 | | | |
| | $d_1$ 2.300 | $N_1$ 1.6676 | $\nu_1$ 42.0 |
| $r_2$ 730.156 | | | |
| | $d_2$ 2.500 | | |
| $r_3$ −18.973 | | | |
| | $d_3$ 2.650 | $N_2$ 1.6830 | $\nu_2$ 31.5 |
| $r_4$ 34.338 | | | |
| | $d_4$ 3.300 | | |
| $r_5$ 97.167 | | | |
| | $d_5$ 2.800 | $N_3$ 1.5688 | $\nu_3$ 56.0 |
| $r_6$ −16.729 | | | |
| | $d_6$ 0.400 | | |
| $r_7$ 32.699 | | | |
| | $d_7$ 1.000 | $N_4$ 1.6734 | $\nu_4$ 29.3 |
| $r_8$ 19.129 | | | |
| | $d_8$ 3.100 | $N_5$ 1.6031 | $\nu_5$ 60.7 |
| $r_9$ −71.296 | | | |
| | $d_9$ 6.000−2.36−0.34 | | |
| S — | | | |
| | $d_{10}$ 1.000−6.32−10.01 | | |
| $r_{10}$ −25.223 | | | |
| | $d_{11}$ 2.400 | $N_6$ 1.8050 | $\nu_6$ 41.0 |
| $r_{11}$ 65.263 | | | |
| | $d_{12}$ 5.300 | | |
| $r_{12}$ 590.702 | | | |
| | $d_{13}$ 1.200 | $N_7$ 1.7200 | $\nu_7$ 52.1 |
| $r_{13}$ 35.602 | | | |
| | $d_{14}$ 2.500 | $N_8$ 1.6660 | $\nu_8$ 48.0 |
| $r_{14}$ 214.217 | | | |
| | $d_{15}$ 12.600−6.284−1.591 | | |
| $r_{15}$ ∞ | | | |
| | $d_{16}$ 3.000 | film holder | |
| $r_{16}$ ∞ | | | |
| | $\Sigma d = 56.810 - 51.798 - 49.183$ | | |

In the case where $\psi_1 = 0.450$, $\psi_2 = -0.0495$, $e_2 = -1.00$, $S_1 = -1316.5$, $X_{max} = 11.01$, the equations of $y_{max} = 7.658$ and $Z = 2.00$ can be obtained. The pupil position is substantially invariable in the zooming condition as shown by the equation of $P_I = -24.4$, $P_{II} = -18.5$.

According to the present invention, it is not necessary that the amount of movement of the aperture stop is quite identical with the value of the condition (15). In other words, the amount of movement of the aperture stop may be substantially equal to the value of the condition (15) to such a degree that the condition of Köhler illumination is substantially fulfilled and the desired illumination intensity is obtained on the image plane. For example, the aperture stop may be linearly moved.

Further, a zoom lens system may be a system in which the reduction side is a telecentric one having a pupil at infinity.

Here, the two-component zoom lens system having positive and negative refractive powers are explained. However, in a three-or more- component zoom lens system comprising a movable or fixed lens system which is disposed at the enlargement side of the first lens group, the pupil position at the reduction side can be invariably maintained by moving an aperture stop.

As described above, in a projecting optical system, there is no need to move a condensing lens group during an operation of zooming, thereby resulting in simplified machine parts and reduced costs. A further advantage is that the user can easily operate since he does not have to adjust the projecting system for satisfying the condition of Köhler illumination.

What is claimed is:

1. A zoom lens system for use in an image projecting apparatus with Köhler illumination in which an image on an object plane is enlargingly projected by the zoom lens system to an image plane apart from the object plane at a definite distance, said zoom lens system comprising:

a first lens group and a second lens group being disposed in this order from the image plane and both being movable along the optical axis for zooming; and an aperture stop disposed between the first and second lens groups, the aperture stop being independently movable along the optical axis so as to make the pupil position at the reduction side substantially invariable during an operation of zooming.

2. A zoom lens system as claimed in claim 1, wherein the pupil position at the reduction side is maintained by affording a predetermined amount of movement to the aperture stop in accordance with the movement of the second lens group.

3. A zoom lens system for use in an image projecting apparatus with Köhler illumination in which an image on an object plane is enlargingly projected by the zoom lens system to an image plane apart from the object plane at a definite distance, said zoom lens system comprising:

a first lens ground and a second lens group being disposed in this order from the image plane and both being movable along the optical axis for zooming; and an aperture stop disposed between the first and second lens groups, the aperture stop being independently movable along the optical axis so as to make the pupil position at the reduction side substantially invariable during an operation of zooming, wherein the amount of movement Z of the aperture stop is represented by the following condition:

$$Z = x - e_2 + \frac{1 - x(\psi_2 - 1/e_2)}{1/e_2 + \psi_2 \times (\psi_2 + 1/e_2)}$$

$\psi_2$: a refractive power of the second lens group, $e_2$: an optical distance from the second lens group to the position of the aperture stop at the longest focal length side, $x$: a distance of movement of the second lens group from the longest focal length side.

4. A zoom lens system as claimed in claim 3, wherein the first lens group has a negative refractive power and the second lens group has a positive refractive power.

5. A zoom lens system as claimed in claim 3, wherein the first lens group has a positive refractive power and the second lens group has a negative refractive power.

6. A zoom lens system for use in an image projecting apparatus with Köhler illumination in which an image on an object plane is enlargingly projected by the zoom lens system to an image plane apart from the object plane at a definite distance, said zoom lens system comprising:
a first lens group having a negative refractive power;
a second lens group having a positive refractive power and being disposed between the first lens group and the object plane;
said first and second lens groups being movable along an optical axis for zooming; and
an aperture stop being disposed between the first and second lens groups and movable so as to make the pupil position at the reduction side substantially invariable in an operation of zooming.

7. A zoom lens system as claimed in claim 6, wherein the first and second lens groups are moved to the reduction side while increasing the distance between the first and second lens groups in an operation of zooming from the longest focal length side to the shortest focal length side.

8. A zoom lens system as claimed in claim 7, wherein the aperture stop is moved to the reduction side while increasing the distance between the aperture stop and the second lens groups in an operation of zooming from the longest focal length side to the shortest focal length side.

9. A zoom lens system as claimed in claim 6, wherein the pupil position at the reduction side is maintained by affording a predetermined amount of movement to the aperture stop in accordance with the movement of the second lens group.

10. A zoom lens system as claimed in claim 9, wherein the amount of movement Z of the aperture stop is represented by following condition:

$$Z = x - e_2 + \frac{1 - x(\psi_2 - 1/e_2)}{1/e_2 + \psi_2 \times (\psi_2 + 1/e_2)}$$

$\psi_2$: a refractive power of the second lens group,
$e_2$: an optical distance from the second lens group to the position of the aperture stop at the longest focal length side,
x : a distance of movement of the second lens group from the longest focal length side.

11. A zoom lens system for use in an image projecting apparatus with Köhler illumination in which an image on an object plane is enlargingly projected by the zoom lens system to an image plane apart from the object plane at a definite distance, said zoom lens system comprising:
a first lens group having a positive refractive power;
a second lens group having a negative refractive power and being disposed between the first lens group and the object plane;
said first and second lens groups being movable along an optical axis for zooming; and
an aperture stop being disposed between the first and second lens groups and movable so as to make the pupil position at the reduction side substantially invariable in an operation of zooming.

12. A zoom lens system as claimed in claim 11, wherein the first and second lens groups are moved to the reduction side while increasing the distance between the first and second lens groups in an operation of zooming from the longest focal length side to the shortest focal length side.

13. A zoom lens system as claimed in claim 12, wherein the aperture stop is moved to the enlargement side so as to increase the distance between the aperture stop and the second lens groups in an operation of zooming from the longest focal length side to the shortest focal length side.

14. A zoom lens system as claimed in claim 11, wherein the pupil position at the reduction side is maintained by affording a predetermined amount of movement to the aperture stop in accordance with the movement of the second lens group.

15. A zoom lens system a claimed in claim 14, wherein the amount of movement Z of the aperture stop is represented by following condition:

$$Z = x - e_2 + \frac{1 - x(\psi_2 - 1/e_2)}{1/e_2 + \psi_2 \times (\psi_2 + 1/e_2)}$$

$\psi_2$: a refractive power of the second lens group,
$e_2$: an optical distance from the second lens group to the position of the aperture stop at the longest focal length side,
x : a distance of movement of the second lens group from the longest focal length side.

16. In a zoom lens system for use in a microfilm image projecting apparatus in which a microfilm is illuminated by an illumination system and an image of the microfilm is projected to a projection plane by the zoom lens system with the Köhler illumination condition maintained, the improvement comprising:
a first lens group being movable along the optical axis for zooming;
a second lens group being disposed at the microfilm side of the first lens group and movable along the optical axis for zooming, and
an aperture stop disposed between the first and second lens group, the aperture stop being movable along the optical axis so as to make the pupil position at the reduction side substantially invariable during an operation of zooming, thereby maintaining the illumination system at a fixed position.

17. A zoom lens system as claimed in claim 16, wherein the pupil position at the reduction side is maintained by affording a predetermined amount of movement to the aperture stop in accordance with the movement of the second lens group.

UNITED STATES PATENT OFFICE
CERTIFICATE OF CORRECTION

Patent No. 4,909,615        Dated March 20, 1990

Inventor(s) Toshihiko Ueda

It is certified that error appears in the above-identified patent and that said Letters Patent is hereby corrected as shown below:

IN THE TITLE, line 3, delete "[KUM./O/ HLER]" and insert --KÖHLER--;

Col. 1, line 2, delete "[KUM./O/]" and insert --KÖHLER--;

line 3, delete "[HLER]".

Signed and Sealed this

Eighteenth Day of June, 1991

*Attest:*

HARRY F. MANBECK, JR.

*Attesting Officer*      *Commissioner of Patents and Trademarks*